US012613483B2

(12) United States Patent
Sato

(10) Patent No.: US 12,613,483 B2
(45) Date of Patent: Apr. 28, 2026

(54) HEATER WITH PLURAL CONDUCTORS WITH CURVED CURRENT PATH THEREBETWEEN

(71) Applicant: CANON KABUSHIKI KAISHA, Tokyo (JP)

(72) Inventor: Noriaki Sato, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/782,681

(22) Filed: Jul. 24, 2024

(65) Prior Publication Data

US 2025/0036055 A1 Jan. 30, 2025

(30) Foreign Application Priority Data

Jul. 25, 2023 (JP) ................................ 2023-120517

(51) Int. Cl.
*G03G 15/20* (2006.01)
*G03G 15/00* (2006.01)

(52) U.S. Cl.
CPC ..... *G03G 15/2053* (2013.01); *G03G 15/2039* (2013.01); *G03G 15/2064* (2013.01); *G03G 15/5004* (2013.01)

(58) Field of Classification Search
USPC ........................................................ 399/328
See application file for complete search history.

(56) References Cited

U.S. PATENT DOCUMENTS

| | | | | |
|---|---|---|---|---|
| 5,525,775 | A | 6/1996 | Setoriyama | |
| 9,217,971 | B1 * | 12/2015 | Matsumoto ........ | G03G 15/2053 |
| 2014/0076878 | A1 | 3/2014 | Shimura | |
| 2022/0299917 | A1 | 9/2022 | Uezono | |

FOREIGN PATENT DOCUMENTS

| | | | |
|---|---|---|---|
| JP | 2021033254 | A | 3/2021 |

* cited by examiner

*Primary Examiner* — Quana Grainger
(74) *Attorney, Agent, or Firm* — Canon U.S.A., Inc., IP Division

(57) ABSTRACT

A heater includes a heater substrate, a first conductor, a second conductor disposed substantially parallel to the first conductor in a longitudinal direction, and at least one heat generator disposed between the first conductor and the second conductor in the transverse direction and configured to electrically connect the first conductor and the second conductor. The at least one heat generator generates heat by energization between the first and second conductors, and a path of a current flowing through the at least one heat generator from one of the first conductor and the second conductor to another conductor has a curved shape.

20 Claims, 11 Drawing Sheets

HEATER WITH PLURAL CONDUCTORS WITH CURVED CURRENT PATH THEREBETWEEN

BACKGROUND

Field

The present disclosure relates to a heater used in a fixing device that fixes a toner image formed by an image forming unit to a recording medium.

Description of the Related Art

An image forming apparatus forms an unfixed toner image corresponding to image information on a recording medium such as paper and a glossy film by an image forming process such as electrophotography, electrostatic recording, and magnetic recording. In such an image forming apparatus, to fix the toner image onto a surface of the recording medium as a permanently fixed image, a heating processing (fixing processing) is performed by an image heating device (fixing device) for melting the toner image and tightly fixing the toner image to the recording medium.

An example of a fixing device using a film heating system discussed is provided in U.S. Pat. No. 5,525,775. In use in a system, a main portion of the fixing device is configured by a fixing film, a plate-like heater that is disposed in an internal space of the fixing film and includes heat generators that generate heat by energization, and a pressing roller that comes into press contact with the heater via the fixing film to form a nip portion. The fixing device using the film heating system provides excellent quick-start performance and power-saving performance due to a small heat capacity.

The fixing device continuously prints a recording medium having a width narrow in a direction orthogonal to a conveyance direction of the recording medium in some cases, i.e., a direction longitudinal to the heater and fixing film. In this case, temperatures rise at portions of the members such as the heater and the fixing film where the recording medium does not pass (hereinafter, non-sheet-passing portions). That is, temperature rise at non-sheet-passing portions. When the temperatures rise at the non-sheet-passing portions, a print speed is reduced in order to reduce the temperatures at the non-sheet-passing portions to heat resisting temperatures or less.

Thus, United States Patent Application Publication No. 2014/0076878 discusses a configuration in which heat generators of a heater are disposed in a plurality of heat generation regions in a longitudinal direction of a recording medium, and heat generation in the heat generation regions are independently controllable. In the configuration, heat generation in the heat generation regions corresponding to the non-sheet-passing portions is reduced, which makes it possible to suppress temperature rise at the non-sheet-passing portions and to prevent the print speed from being reduced.

Further, in the configuration discussed in United States Patent Application Publication No. 2014/0076878, the heat generators are disposed in parallel between two conductors disposed in substantially parallel to each other in a longitudinal direction on a heater substrate, thereby causing a current to flow in a transverse direction of the heater, i.e., a direction parallel to a conveyance direction of a recording medium. In this configuration, even in a case where the temperatures partially rise at the non-sheet-passing portions in the same heat generation region, resistance values of the heat generators are increased at the non-sheet-passing portions. Thus, due to positive resistance-temperature characteristics of the heat generators, a current flows bypassing the non-sheet-passing portions, making it possible to suppress temperature rise at the non-sheet-passing portions.

Further, United States Patent Application Publication No. 2022/0299917 discusses a configuration in which heat generators disposed in parallel between two conductors are formed obliquely to a transverse direction of a heater, thereby reducing temperature unevenness in a longitudinal direction occurring between a heat generator portion and an interval portion provided with no heat generator.

As discussed in United States Patent Application Publication No. 2022/0299917, in a case where a heater driving voltage applied between the two conductors is high, the heater quickly deteriorates and service lifetime is reduced.

SUMMARY

The present disclosure is directed to a technique for reducing temperature unevenness and suppressing deterioration of a heater.

An aspect of the present disclosure provides a heater that includes a heater substrate; a first conductor disposed on a surface of the heater substrate along a longitudinal direction thereof; a second conductor disposed substantially parallel to the first, with an interval separating the second conductor from the first conductor in a transverse direction; and at least one heat generator disposed between the first conductor and the second conductor in the transverse direction of the heater substrate and configured to electrically connect the first conductor and the second conductor. at least one heat generator is configured to generate heat in response to energization between the first conductor and the second conductor. A path of a current flowing through the at least one heat generator from one of the first conductor and the second conductor to another one of the first conductor and the second conductor has a curved shape.

Another aspect of the present disclosure provides a heater that includes a heater substrate; a first conductor disposed on a surface of the heater substrate along a longitudinal direction thereof; a second conductor disposed substantially parallel to and spaced apart from the first conductor; and at least one heat generator disposed between the first conductor and the second conductor in a transverse direction and configured to electrically connect the first conductor and the second conductor. The at least one heat generator is configured to generate heat in response to application of electrical energy between the first conductor and the second conductor. A path of a current flowing through the at least one heat generator from one of the first conductor and the second conductor to another one of the first conductor and the second conductor has a non-linear shape.

Aspects of the present disclosure make possible reduction of the temperature unevenness and suppress heater deterioration. Additional aspects of the present disclosure will become apparent from the following description with reference to the attached drawings.

DESCRIPTION OF THE EMBODIMENTS

Exemplary embodiments of the present disclosure will be described in detail below with reference to drawings. Note that dimensions, materials, shapes, relative arrangement, and the like of components described in the exemplary embodiments may be appropriately changed depending on a configuration of an apparatus to which the disclosure is applied and various kinds of conditions. In other words, the scope of the present disclosure is not limited to the following exemplary embodiments.

An image forming apparatus, a fixing device, and a heater according to an embodiment will be described, and then a shape of a heat generator of the heater, which is a feature of the present disclosure, will be described in detail.

[Image Forming Apparatus]

Figure 1:
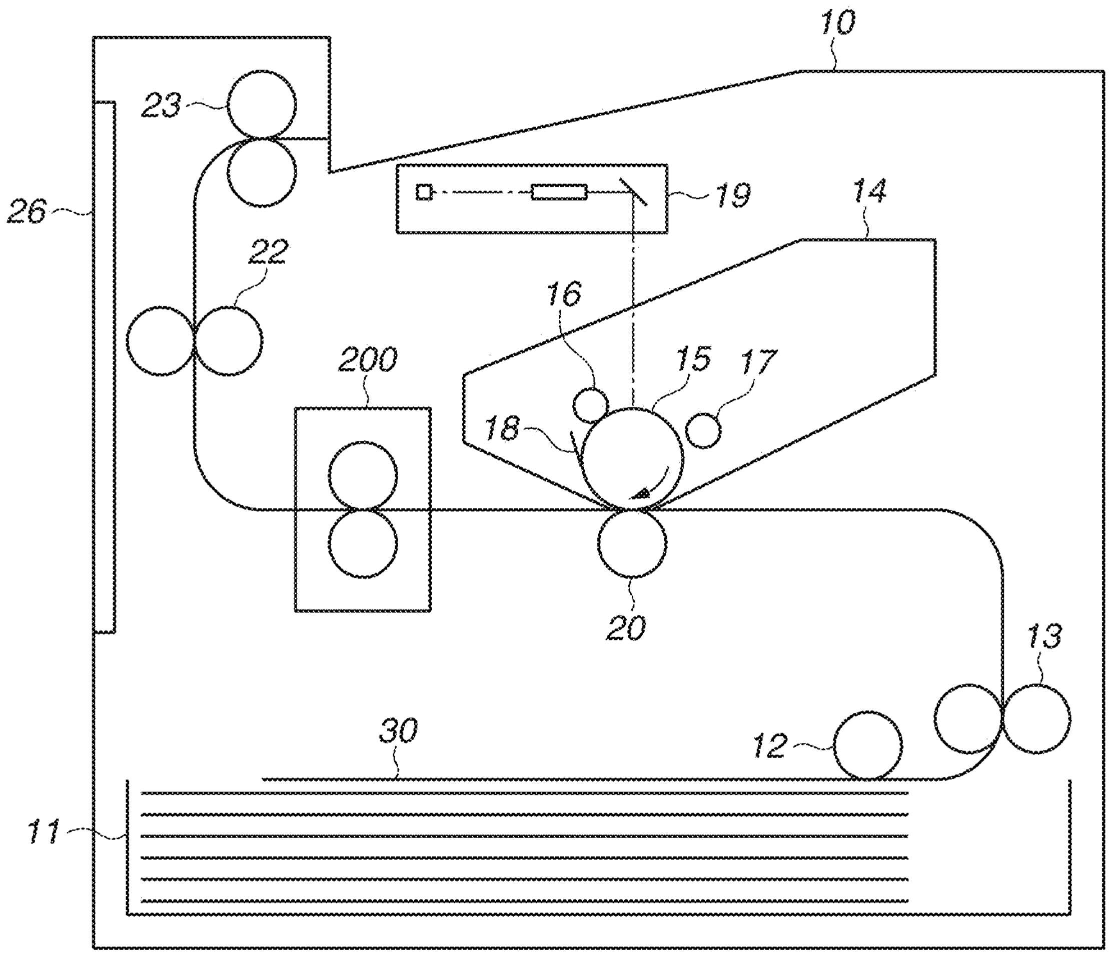
FIG. 1 is a schematic configuration diagram of an image forming apparatus according to an embodiment.

FIG. 1 is a schematic diagram illustrating an example of an electrophotographic laser beam printer as the image forming apparatus. Image forming operation by the image forming apparatus 10 will be described. A recording medium 30 (sheet) is individually fed from a sheet feeding tray 11 by a sheet feeding roller 12, and is conveyed by conveyance rollers 13 to a process cartridge 14 at a predetermined timing. The process cartridge 14 incorporates a photosensitive drum 15, a charger 16, and a developer 17. The charger 16 is in press contact with the photosensitive drum 15, and a surface of the photosensitive drum 15 is uniformly charged by the charger 16. Thereafter, a scanner 19, as an exposure unit, performs exposure based on image information, to form an electrostatic latent image on the surface of the photosensitive drum 15. The developer 17 is provided on a downstream of an exposure position in a rotation direction of the photosensitive drum 15. When the electrostatic latent image formed on the photosensitive drum 15 reaches a position facing the developer 17, toner is supplied to the electrostatic latent image from the developer 17, and a toner image (visible image) is formed on the photosensitive drum 15.

The recording medium 30 is conveyed at a timing synchronizing with a moving speed of the toner image formed on the photosensitive drum 15. At a transfer nip where the photosensitive drum 15 and a transfer roller 20 are in press contact with each other, the toner image on the photosensitive drum 15 is transferred to the recording medium 30 having reached the photosensitive drum 15.

The recording medium 30 to which the toner image has been transferred is conveyed to a fixing device 200 including a heater 300 provided with heat generators that generate heat by receiving power. The fixing device 200 includes two rotation embers that face each other and rotate while being in press contact with each other, and fixes the toner image on the recording medium 30 by heat and pressure.

Thereafter, the recording medium 30 is discharged to outside of the apparatus by discharge rollers 22 and 23, and a series of print operation ends. A cleaner 18 cleans the photosensitive drum 15.

The image forming apparatus is not limited to the image forming apparatus illustrated in FIG. 1, and may be, for example, a color image forming apparatus including a plurality of image forming units corresponding to respective colors. Alternatively, the image forming apparatus may be an image forming apparatus including a primary transfer unit transferring the toner image on the photosensitive drum 15 to an intermediate transfer belt, and a secondary transfer unit transferring the toner image on the intermediate transfer belt to the sheet.

[Fixing Device 200]

Figure 2:
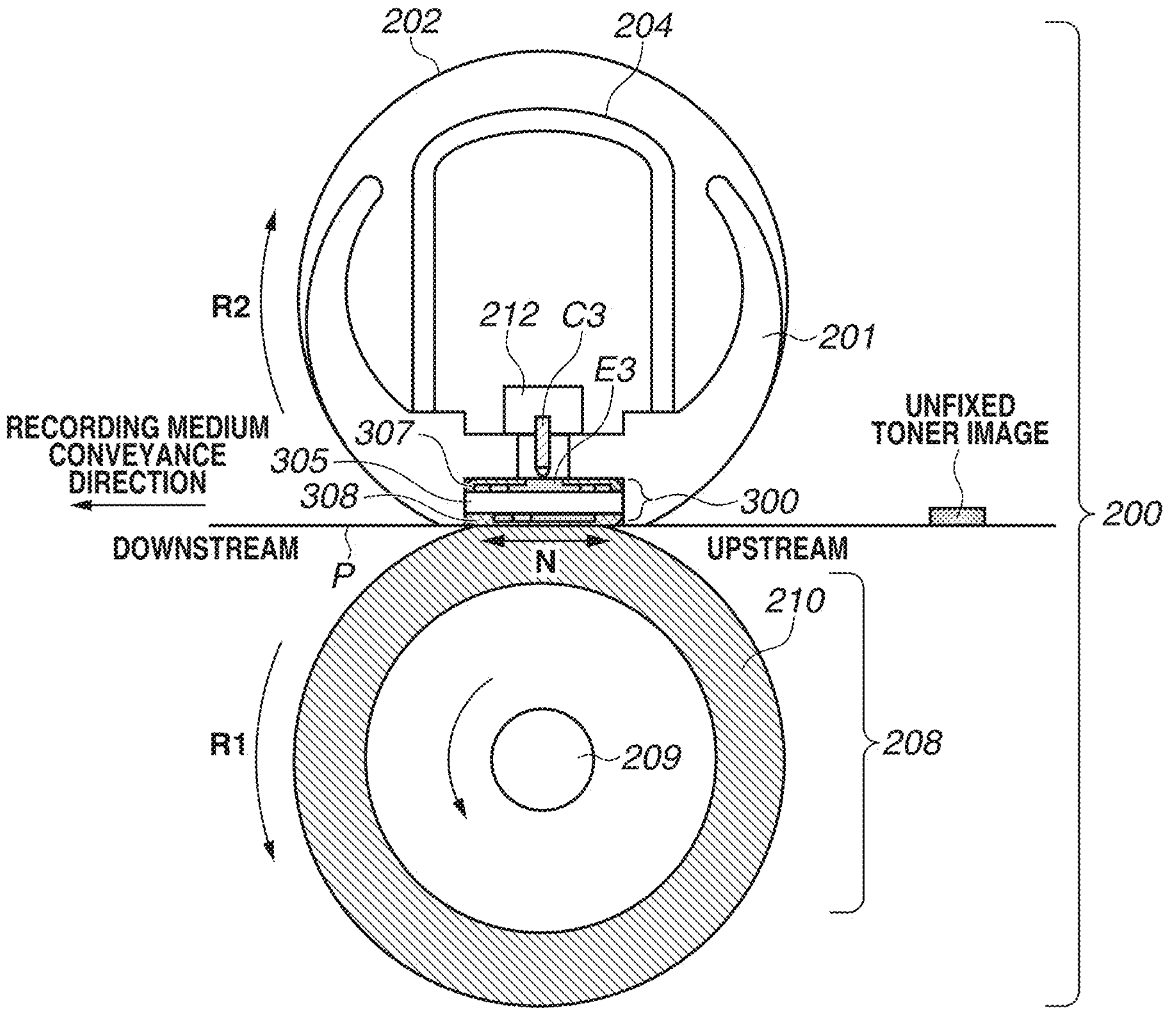
FIG. 2 is a schematic cross-sectional view of a fixing device according to an embodiment.

FIG. 2 is a schematic cross-sectional view of the fixing device 200 according to the present embodiment. The fixing device 200 includes a fixing film 202 as a belt member, and the heater 300 that is disposed in an internal space of the fixing film 202 and comes into contact with an inner surface of the fixing film 202. The fixing device 200 further includes a pressing roller 208 as a nip forming member that forms a fixing nip portion N together with the heater 300 via the fixing film 202, and a metal stay 204.

The fixing film 202 is a heat-resistant multilayer film formed in a cylindrical shape, and includes a heat-resistant thin resin such as polyimide or a metal such as stainless steel as a base layer. To prevent toner adhesion and to secure releasability from a recording medium P, a surface of the fixing film 202 is coated with a releasing layer made of a heat-resistant resin excellent in releasability, such as tetrafluoroethylene-perfluoro (alkyl vinyl ether) copolymer (PFA). To improve image quality, an elastic layer made of a heat-resistant rubber such as a silicone rubber may be further provided between the base layer and the releasing layer.

The pressing roller 208 includes a core metal 209 made of iron, aluminum, or the like, and an elastic layer 210 made of a silicon rubber or the like.

The heater 300 includes the heat generators, electrodes for power feeding, and protection layers on a heater substrate 305 made of ceramic, and generates heat by energization to the heat generators. A metal plate besides the ceramic material may be used for the heater substrate 305. In this case, insulating layers may be added between the electrodes and the metal plate and between the heat generators and the metal plate. As the protection layers of the heater 300, a surface protection layer 308 provided on the fixing nip portion N side and a surface protection layer 307 provided on a side opposite to the fixing nip portion N are provided.

The plurality of electrodes (electrode E3 described below is illustrated as representative) provided on the side opposite to the fixing nip portion N and a plurality of electric contacts (electric contact C3 described below is illustrated as representative) are provided, and power is fed from the electric contacts to the respective electrodes. Details of the heater 300 will be described below.

Further, a safety element 212, such as a thermal switch and a temperature fuse, that operates in response to abnormal heat generation of the heater 300 and interrupts the power supplied to the heater 300 is directly in contact with the heater 300 or indirectly in contact with the heater 300 through a heater holding member 201.

The heater 300 is held by the heater holding member 201 made of a heat-resistant resin, and heats the fixing film 202. The heater holding member 201 has a guide function of guiding rotation of the fixing film 202.

The metal stay 204 receives a pressing force to urge the heater holding member 201 holding the heater 300 toward the pressing roller 208, thereby forming the fixing nip portion N between the fixing film 202 and the pressing roller 208.

The pressing roller 208 rotates in a direction of an arrow R1 by receiving power from a motor. When the pressing roller 208 rotates, the fixing film 202 rotates in a direction of an arrow R2 following the pressing roller 208. The recording medium P receives heat of the fixing film 202 while being held and conveyed at the fixing nip portion N. As a result, the unfixed toner image on the recording medium P is fixed. In addition, to secure slidability of the fixing film 202 and to obtain a stable driven rotating state, fluorine-based lubricating grease having high heat resistance is interposed between the heater 300 and the fixing film 202.

Besides the grease, another member such as a sheet member may be interposed between the heater 300 and the fixing film 202 in order to secure slidability and to uniformize the temperature.

[Heater 300]

Figure 3A:
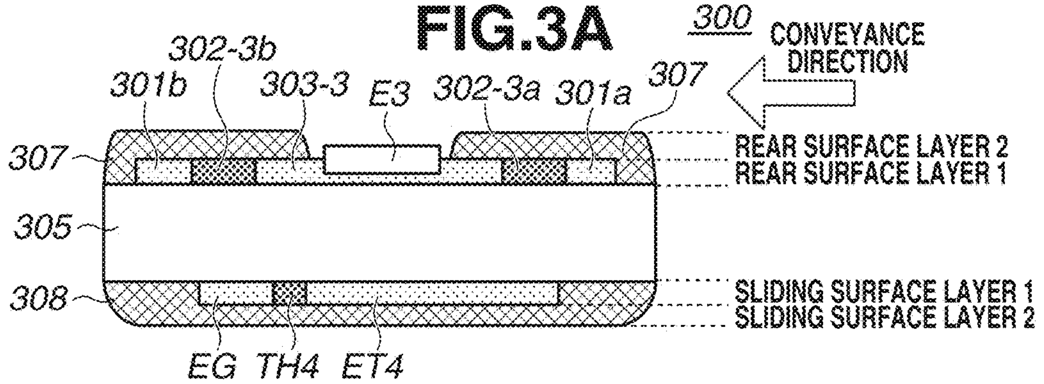
FIG. 3A is a cross-sectional view and FIGS. 3B to 3E are plan views of a heater according to an embodiment.
Figure 3B:
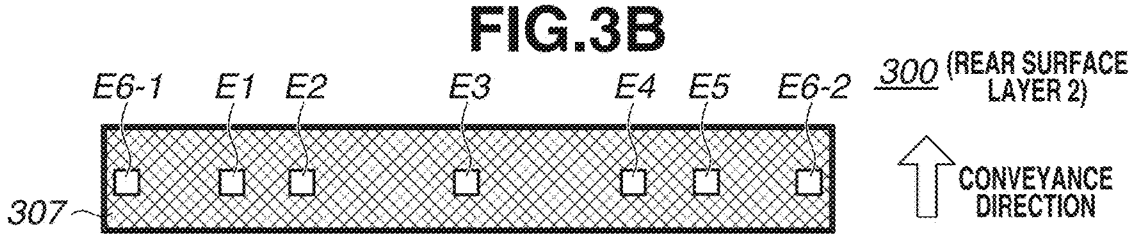
Figure 3C:
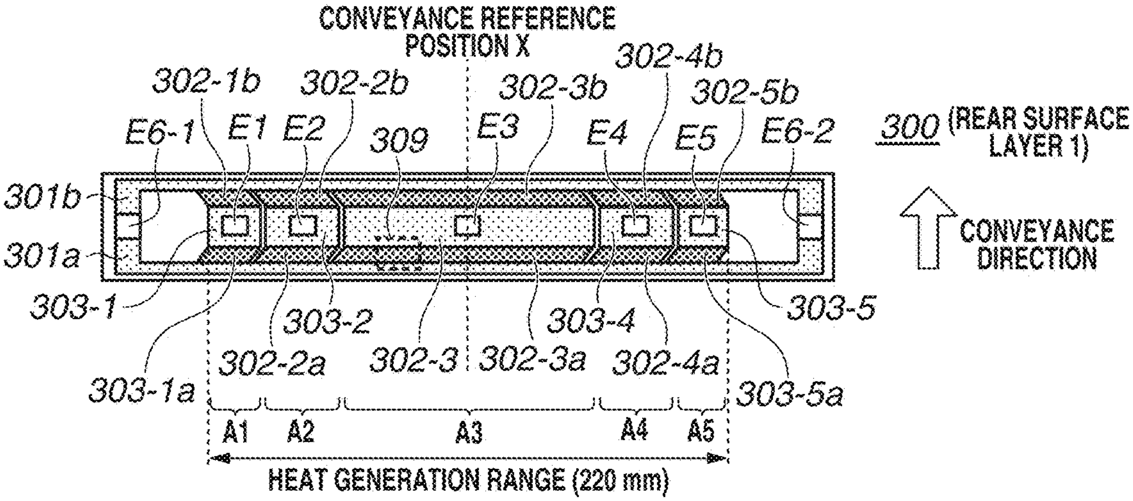
Figure 3D:
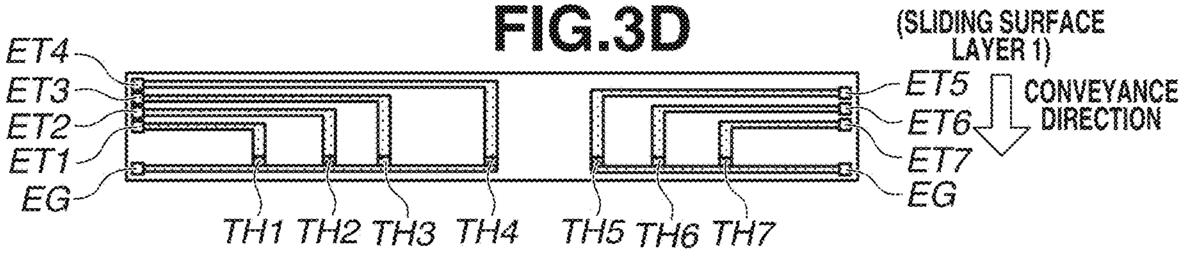
Figure 3E:
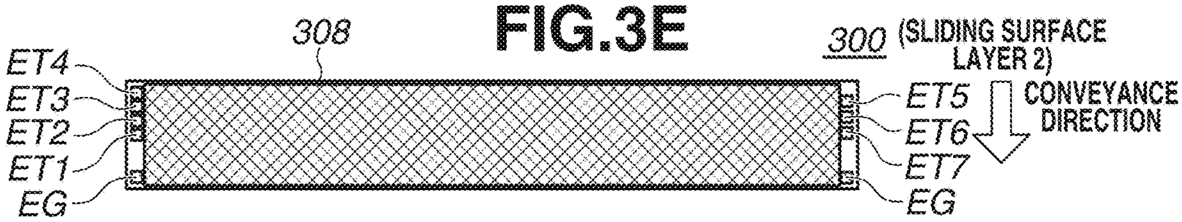

A configuration of the heater 300 will be described with reference to FIGS. 3A and 3B. FIG. 3A is a cross-sectional view of the heater 300, and FIGS. 3B to 3E are plan views of each of layers of the heater 300. In FIGS. 3B to 3E, a conveyance reference position X of the recording medium P in the image forming apparatus 10 is illustrated. In the present embodiment, a conveyance reference is centrally positioned. The recording medium P is conveyed such that a center line in a direction (longitudinal direction) orthogonal to the conveyance direction is aligned with the conveyance reference position X. FIG. 3A is the cross-sectional view of the heater 300 at the conveyance reference position X.

The heater 300 includes the heater substrate 305 made of ceramic as a planar base member. A rear surface layer 1 and a rear surface layer 2 covering the rear surface layer 1 are provided on the heater substrate 305. A sliding surface layer 1 and a sliding surface layer 2 covering the sliding surface layer 1 are provided on a surface of the heater substrate 305 on a side opposite to the rear surface layer 1.

The rear surface layer 1 includes conductor patterns 301 and 303 that are substantially parallel to each other in a longitudinal direction of the heater substrate 305. The conductor pattern 301 is divided into a conductor pattern 301*a* on an upstream side in the conveyance direction (transverse direction of substrate) and a conductor pattern 301*b* on a downstream side, but the conductor patterns 301*a* and 301*b* are electrically connected and function as one conductor pattern. A heat generator pattern 302 is provided between the conductor pattern 301 and the conductor pattern 303. The heat generator pattern 302 is configured such that heat generators generate heat by energization between the conductor patterns 301 and 303 in the conveyance direction.

As with the conductor pattern 301, the heat generator pattern 302 is also disposed by being divided into heat generator patterns (e.g., 302-1*a*) on the upstream side in the conveyance direction and heat generator patterns (e.g., 302-1*b*) on the downstream side.

The conductor pattern 303 is divided into conductor patterns 303-1 to 303-5 respectively corresponding to five longitudinal regions A1 to A5, and each of the conductor patterns 303-1 to 303-5 is connected to an independent power supply circuit. Therefore, each of heat generator patterns 302-1 to 302-5 divided corresponding to the respective longitudinal regions can independently control a heat generation amount. Even in a case where a recording medium having a narrow width is fed, it is possible to suppress temperature rise at the non-sheet-passing portions, as with the technique discussed in United States Patent Application No. 2014/0076878.

In the present embodiment, among the five divided longitudinal regions, a longitudinal width of the region A3 at a longitudinal center is set to 145 mm that is close to a sheet width of A5 size. A longitudinal width of a region including the regions A2 to A4 is set to 185 mm that is close to a sheet width of B5 size. Further, a width of a region including the regions A1 to A5 is set to 220 mm that is close to a sheet width of letter size. In other words, the heat generator pattern is formed to have an entire length of 220 mm.

The number of divisions of the heat generator pattern is optional. In the present embodiment, the heat generator patterns (e.g., 302-2 and 302-4) independently driven at symmetrical positions may be driven as one heat generator pattern.

In the drawings, reference numerals E1 to E5 denote the electric contacts for feeding power to the respective heat generator patterns, and a reference numeral E6 denotes a common electrode contact. When the various kinds of patterns are configured as described above, energization paths from the power feeding electrodes E1 to E5 independent for each heat generator pattern to the common electrode E6 via the conductor patterns 303-1 to 303-5, the heat generator patterns 302-1 to 302-5, and the conductor pattern 301 are formed.

The rear surface layer 2 includes the surface protection layer 307 having insulating property (e.g., glass), and covers the conductor pattern 301, the conductor pattern 303, and the heat generator pattern 302. The surface protection layer 307 is provided except for portions corresponding to the electrodes E, and is configured to enable connection of the electric contacts to the respective electrodes E from the rear surface layer 2 side of the heater 300.

In the sliding surface layer 1 positioned on a side opposite to the rear surface layer 1 of the heater substrate 305, thermistors (TH-1 to TH-7) as temperature detectors are provided to detect temperatures of the respective longitudinal regions where the respective heat generator patterns 302-1 to 302-5 are disposed. Further, conductors ET1 to ET7 functioning as independent wiring patterns for taking out temperature signals detected by the respective thermistors and a conductor EG functioning as a power feeding wiring pattern common to the thermistors are also provided.

As described above, providing the temperature detectors in respective heating regions heated by the heat generators makes it possible to control the heating regions A1 to A5 of the heater arranged in the longitudinal direction to independent different temperatures.

The sliding surface layer 2 includes the surface protection layer 308 having slidability and insulating property (e.g., glass), covers the thermistors TH, the conductors ET, and the conductor EG, and secures slidability with the inner surface of the fixing film 202. The surface protection layer 308 is provided except for both longitudinal ends of the heater 300 because electric contacts for the conductors ET and the conductor EG are provided.

Resistance values of the heat generators are set such that, in a case where a commercial alternating-current power supply of 120 V is connected, the heat generators output 1440 W, as a whole. In other words, a combined resistance in a case where the heat generators are connected in parallel with each other is 10Ω.

[Shape of Heat Generator Pattern of Heater]

Figure 4:
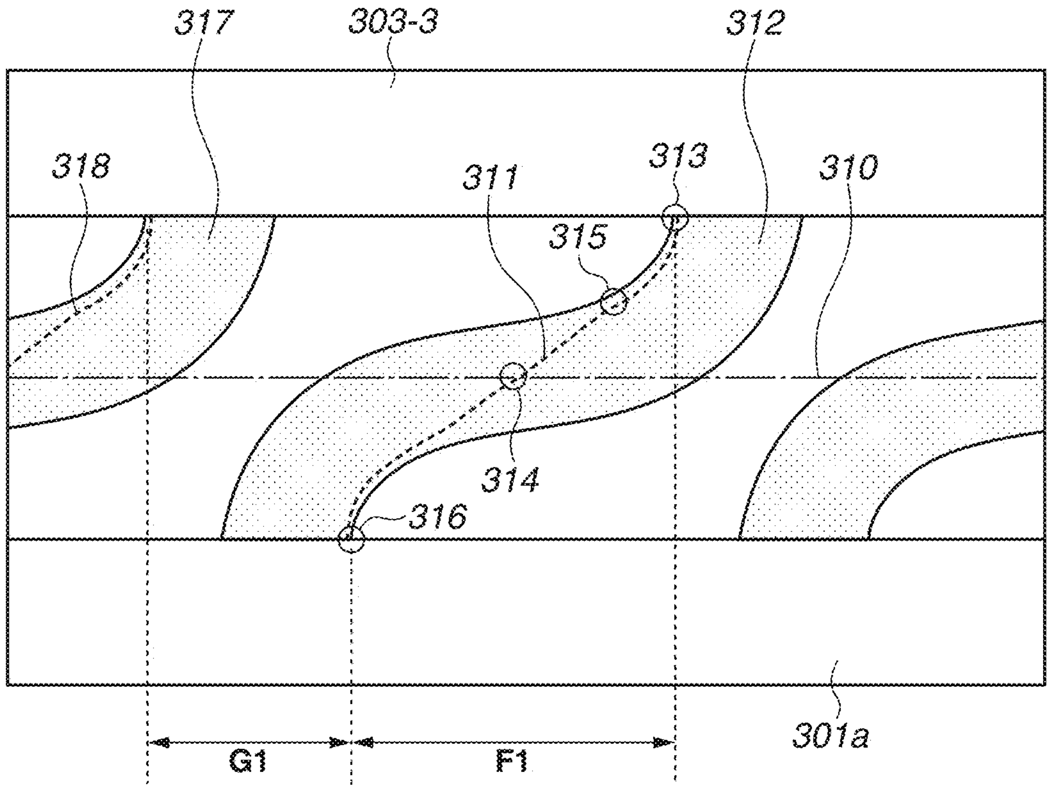
FIG. 4 illustrates a heat generation pattern of the heater according to an embodiment.

FIG. 4 illustrates a shape of the heat generator pattern 302-3$a$ of the heater 300 at a portion 309 surrounded by a dotted line in FIG. 3B. The conductor pattern 303-3 and the conductor pattern 301$a$ are respectively illustrated at an upper part and a lower part in the drawing, and a heat generator 312 is provided in parallel therebetween. A portion where the heat generator is not provided between the conductor patterns is electrically insulated. A current does not flow through the portion and thus heat is not generated.

In the present embodiment, to reduce temperature unevenness in the longitudinal direction, each heat generator is disposed while being obliquely inclined to the transverse direction of the heater 300 (conveyance direction, i.e., the vertical direction in FIG. 4). In addition, the heat generator 312 does not have a linear rod shape. Rather, the heat generator 312 may have a curved shape, as described below. FIG. 4 illustrates a center line 310 between the conductor pattern 303-3 and the conductor pattern 301$a$. Also illustrated in FIG. 4 is a path of reduced distance, i.e., a shortest path, 311 of a current flowing through the heat generator 312 from the conductor pattern 303-3 to the conductor pattern 301$a$. An electric field is generated in the vertical direction in the drawing by a heater driving voltage applied between the conductor patterns. Therefore, most of the current flows through the shortest path in the heat generator in the vertical direction. As a result, portions where a heat generation amount is large tend to concentrate on the shortest path 311.

The shape of the heat generator according to the present embodiment has the following characteristics. Firstly, the shortest path 311 of the current flowing through the heat generator 312 does not have a linear shape, and is at least partially curved. Secondly, in the shortest path 311, before the path reaches an intermediate point 314 between one of the conductor patterns to the other conductor pattern, an inclination of a tangent of the shortest path 311 changes a plurality of times or continuously. Thirdly, the shortest path 311 extends from the one conductor pattern 303-3 to the other conductor pattern 301$a$ without being folded back in the longitudinal direction of the heater substrate 305. In other words, the shortest path 311 extends from one side to the other side in the longitudinal direction (right-left direction, i.e., horizontal, in the figures) while extending from one side to the other side in the transverse direction (vertical direction in the figures), and the path does not extend in a direction opposite thereto. It can also be said that the heat generator has a shape not overlapping in the transverse direction.

A locus of the shortest path 311 from the conductor pattern 303-3 to the intermediate point 314 in FIG. 4 will be described as an example. The locus from a left end 313 of a boundary between the conductor pattern 303-3 and the heat generator 312 to a middle point 315 is a curved line along an outline of the curved heat generator on a left side, and the inclination of the tangent of the shortest path 311 continuously changes. The locus from the middle point 315 to the intermediate point 314 is a linear line crossing the heat generator.

In the present embodiment, a distance from a point where the inclination of the tangent first changes to a point where the inclination of the tangent finally changes is referred to as a distance of inclination change region. A percentage of the distance (distance of inclination change region) from the point where the inclination of the tangent first changes to the point where the inclination of the tangent finally changes with respect to the distance from the left end 313 to the intermediate point 314 of the shortest path 311 is referred to as a percentage of inclination change region. In the present embodiment, the point where the inclination of the tangent first changes is the left end 313, and the point where the inclination of the tangent finally changes is the middle point 315. In the present embodiment, the percentage of the inclination change region is set to about 50%.

When the percentage of the inclination change region is set to be relatively small, and regions where the inclination of the tangent of the shortest path 311 of the current changes excessively concentrate in a short distance, heat generation concentrates in a narrow region, and an effect of suppressing deterioration of the heater 300 is not sufficiently achieved. When the percentage of the inclination change region of at least 20% or more is secured, the effect of suppressing deterioration of the heater is achievable. Although the inclination of the tangent of the shortest path 311 changes, the shortest path 311 extends leftward from a right side in the drawing, and does not overlap in the transverse direction.

Positional relationship between the heat generator 312 and a heat generator 317 arranged side by side in the longitudinal direction in FIG. 4 are described. A reference numeral F1 in the drawing indicates a distance from a start point (left end) 313 to an end point 316 of the shortest path 311 of the current in the longitudinal direction, namely, a passing width of the shortest path 311 of the current in the longitudinal direction. A reference numeral G1 in the drawing indicates a distance from the end point 316 of the shortest path 311 of the current to a start point of a shortest path 318 of the current of the heat generator 317 next to the heat generator 312 (i.e., non-passing width of shortest path of current in longitudinal direction).

In the present embodiment, the heat generators are arranged side by side so as to establish relationship of F1>G1. Such arrangement makes it possible to reduce the width G1 of the longitudinal region where the shortest path of the current does not extend and the heat generation amount is relatively small, and to reduce heat generation unevenness and image gloss unevenness caused by the heat generation unevenness.

[Effects by Heat Generator Pattern]

To describe effects by the present embodiment, results obtained by comparing performance of the heat generator pattern according to the present embodiment illustrated in FIG. 4 and performance of heat generator patterns according to comparative examples described below in terms of durability of the heater and temperature unevenness in the longitudinal direction are described.

Figure 5:
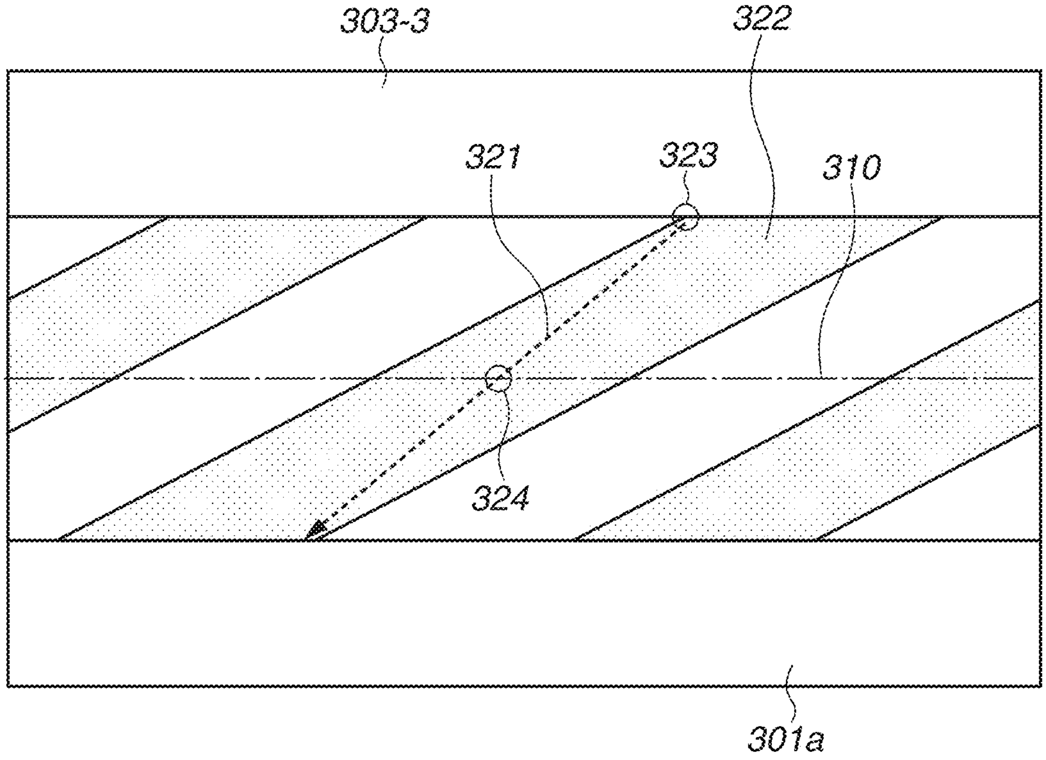
FIG. 5 illustrates a heat generation pattern of a heater according to a first comparative example.

FIG. 5 illustrates a heat generator pattern according to a first comparative example. In the first comparative example, a heat generator 322 has an oblique rod shape that can achieve an effect of reducing heat generation unevenness as with the configuration discussed in United States Patent Application Publication No. 2022/0299917. In the first comparative example, a shortest path 321 of the current has a linear shape as illustrated in FIG. 5. In other words, in the heat generator 322 according to the first comparative example, an inclination of a tangent of the shortest path 321 extending from a left end 323 of a boundary between the heat generator 322 and the conductor pattern 303-3 to an intermediate point 324 does not change even once.

Figure 6:
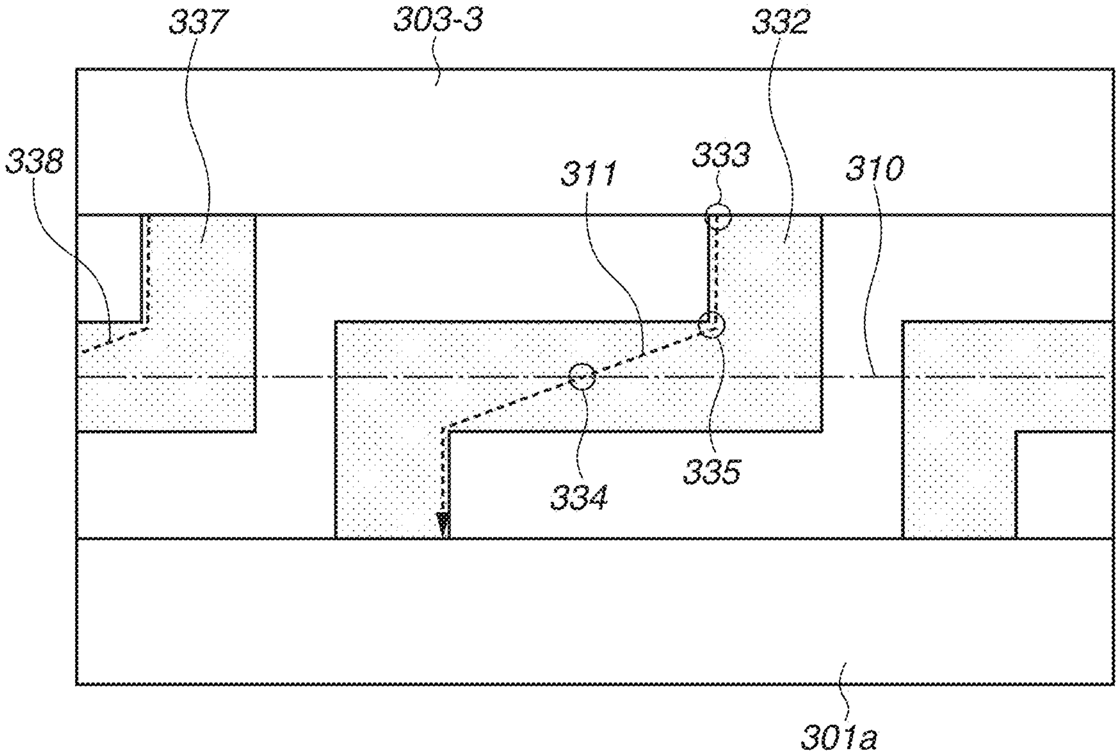
FIG. 6 illustrates a heat generation pattern of a heater according to a second comparative example.

FIG. 6 illustrates a heat generator pattern according to a second comparative example. In the second comparative example, in a heat generator 332 illustrated in FIG. 6, an inclination of a tangent changes only once at a middle point 335 between a left end of a boundary between the heat generator 332 and the conductor pattern 303-3, and an intermediate point 334.

Figure 7:
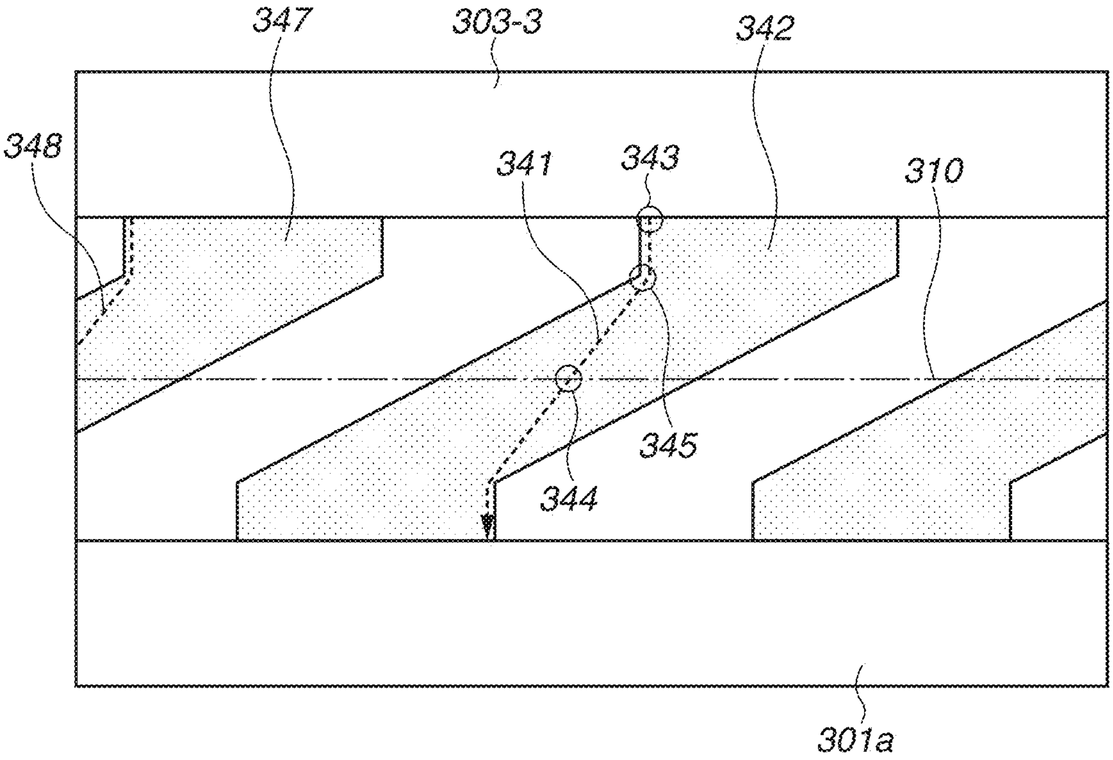
FIG. 7 illustrates a heat generation pattern of a heater according to a third comparative example.

FIG. 7 illustrates a heat generator pattern according to a third comparative example. In the third comparative example, as in the second comparative example, a shortest path 341 of the current has a broken-line shape in which an inclination of a tangent changes only once at a middle point 345 between a left end 343 of a boundary between a heat generator 342 and the conductor pattern 303-3, and an intermediate point 344.

Figure 8:
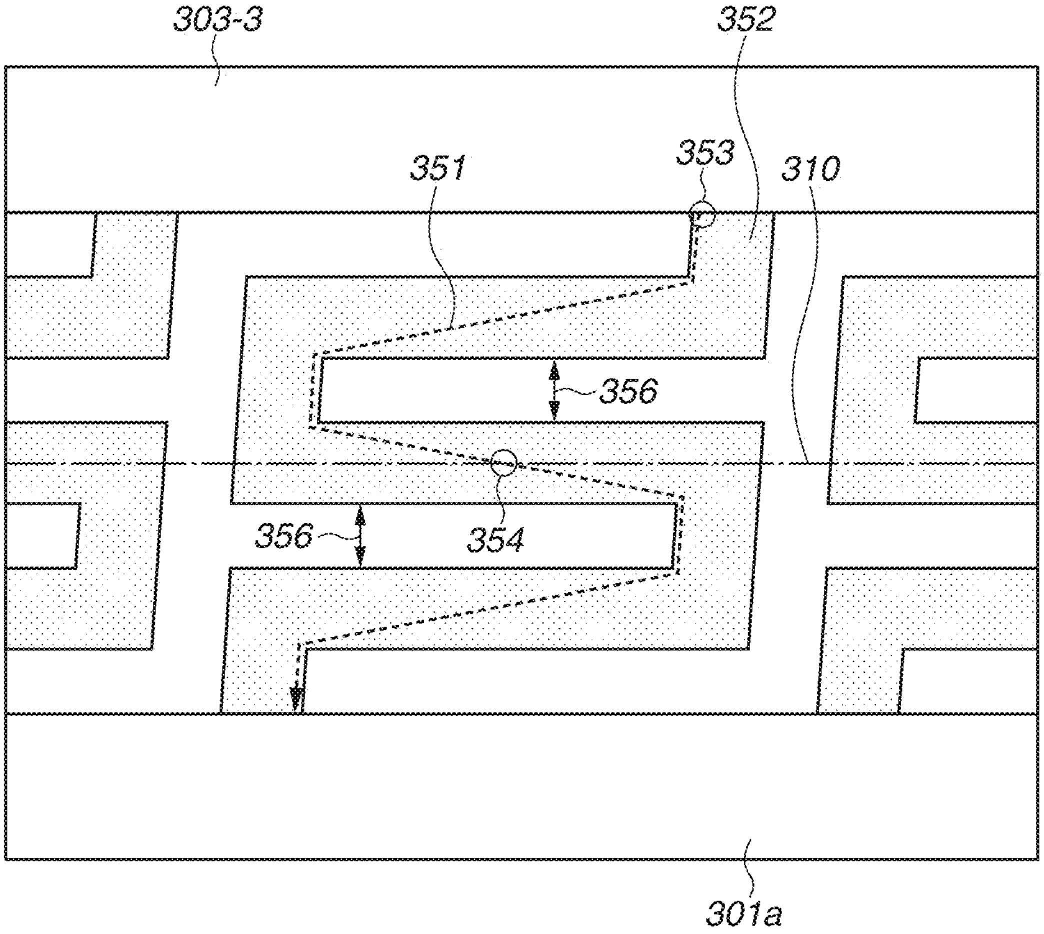
FIG. 8 illustrates a heat generation pattern of a heater according to a fourth comparative example.

FIG. 8 illustrates a heat generator pattern according to a fourth comparative example. In the fourth comparative example 4, as illustrated in FIG. 8, a heat generator 352 has a shape folded back in the longitudinal direction. The configuration is discussed in Japanese Patent Application Laid-Open No. 2021-33254. In the fourth comparative example, an inclination of a tangent of a shortest path 351 of the current changes a plurality of times (three times) before an intermediate point 354, and the shortest path 351 of the current is folded back twice in the longitudinal direction.

In comparison of durability, supposing a case where a high voltage was applied, printing durability test was performed in a state where a heater driving voltage was set to 140 V. The heater in which deterioration of the heat generator was observed before the number of prints reached the estimated lifetime number of prints (100%) was evaluated as “C”, the heater in which deterioration of the heat generator was observed before the number of prints reached a number 1.5 times the lifetime number of prints was evaluated as “B”, and the heater in which deterioration of the heat generator was not observed when the number of prints exceeded the number 1.5 times the lifetime number of prints was evaluated as “A”. As for deterioration of the heater, the heater in which the resistance value (resistance value between conductor patterns 303-3 and 301*a*) was increased by 3% or more from an initial value was determined to be deteriorated.

Table 1 illustrates results of a durability comparison.

TABLE 1

| | Durability | Others |
|---|---|---|
| Exemplary embodiment | A | |
| First comparative example | B | |
| Second comparative example | B | |
| Third comparative example | B | |
| Fourth comparative example | A | Heater was upsized |

In the heat generator patterns according to the first, second, and third comparative examples, deterioration of the heater (increase in resistance value) was observed before the number of prints reached the number 1.5 times the lifetime number of prints. In contrast, in the heat generator pattern according to the present embodiment, deterioration was not observed, and improvement in durability was confirmed. Temperature unevenness did not occur in the present embodiment and the first, second, and third comparative examples.

In the heat generator pattern according to the fourth comparative example, no problem occurred in durability and temperature unevenness, but other issues arose due to folding-back of the heat generator pattern. More specifically, to prevent folded-back parts of the heat generator from overlapping with one another in the transverse direction and to electrically insulate the folded-back parts from one another, blank parts 356 where no heat generator was provided were necessary, in addition to the width of the heat generator corresponding to the number of times of folding-back. This largely increased the width of the heat generator in the transverse direction (interval between conductor patterns). As a result, the width of the heater in the transverse direction was increased, and the fixing device was accordingly upsized.

[Reason for Achieved Effects]

Figure 9A:
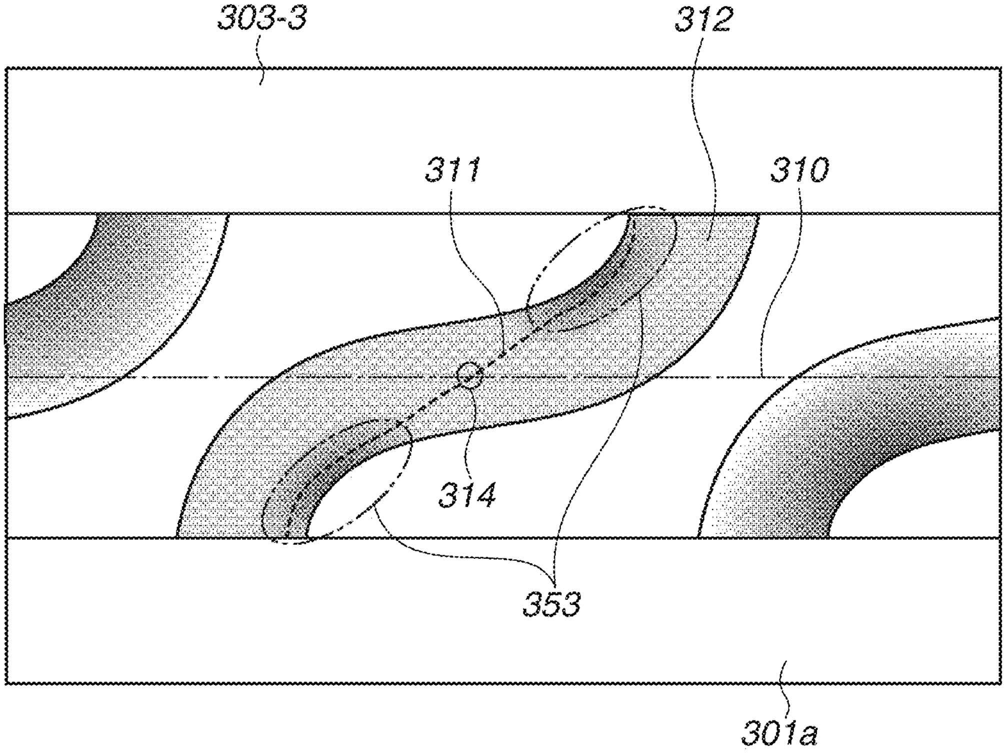
FIGS. 9A and 9B are diagrams comparing heat generation distribution by the heat generation pattern of the heater according to an embodiment and heat generation distribution by the heat generation pattern of the heater according to the first comparative example.
Figure 9B:
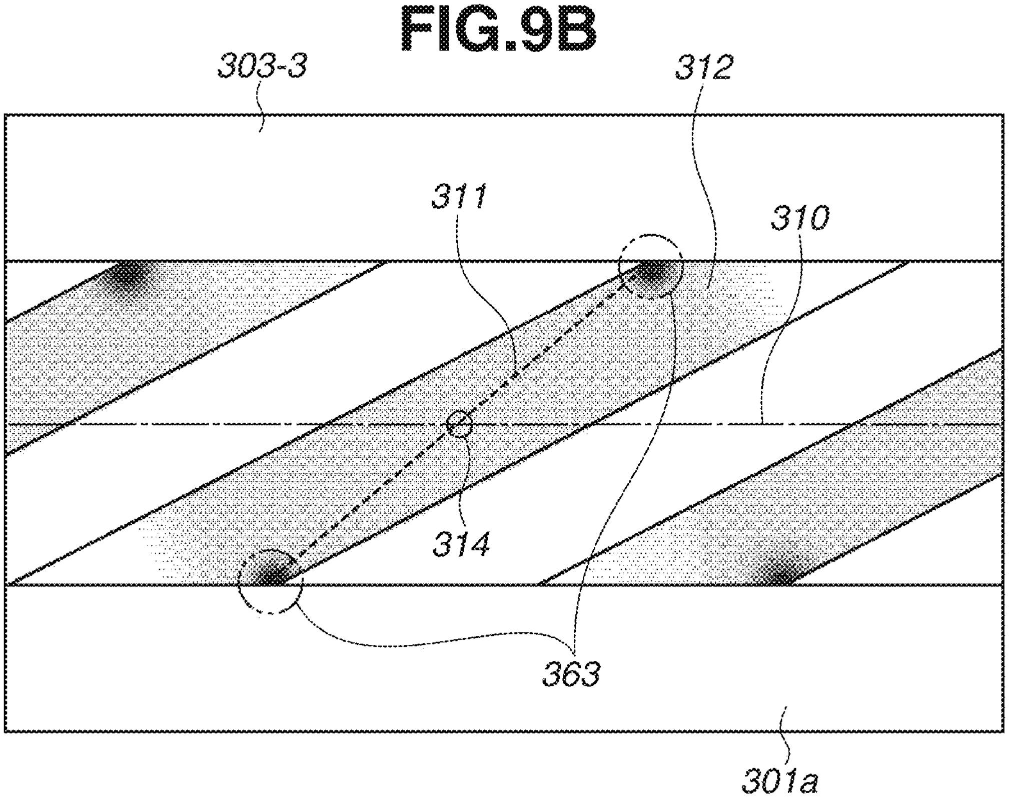

A reason for a difference in durability between the embodiment and the first comparative example will be described. FIGS. 9A and 9B are diagrams for comparing heat generation distribution (simulation result) of the heater according to the present embodiment and heat generation distribution of the heater according to the first comparative example.

FIG. 9A illustrates the heat generation distribution according to the embodiment, and FIG. 9B illustrates the heat generation distribution according to the first comparative example. In the drawings, a portion where the heat generation amount is large is illustrated in a dark color, and a portion where the heat generation amount is small is illustrated in a light color. For comparison, the entire heat generation amounts are equal between the embodiment and the first comparative example.

In both of the embodiment and the first comparative example, a portion where the shortest path of the current is close to the outline (boundary) of the heat generator is illustrated in the dark color, and the heat generation amount at the portion is large. More specifically, in the embodiment, portions 353 in FIG. 9A are illustrated in the dark color, and the heat generation amounts at the portions 353 are large. In the first comparative example, portions 363 in FIG. 9B are illustrated in the dark color, and the heat generation amounts at the portions 363 are large.

In the first comparative example, a state where heat generation excessively concentrate on a center of each of the portions 363 is observed. In contrast, in the embodiment, regions where the heat generation amount is large are dispersed and distributed in each of the portions 353 close to the outline of the heat generator where the shortest path of the current is continuously curved.

Figure 10A:
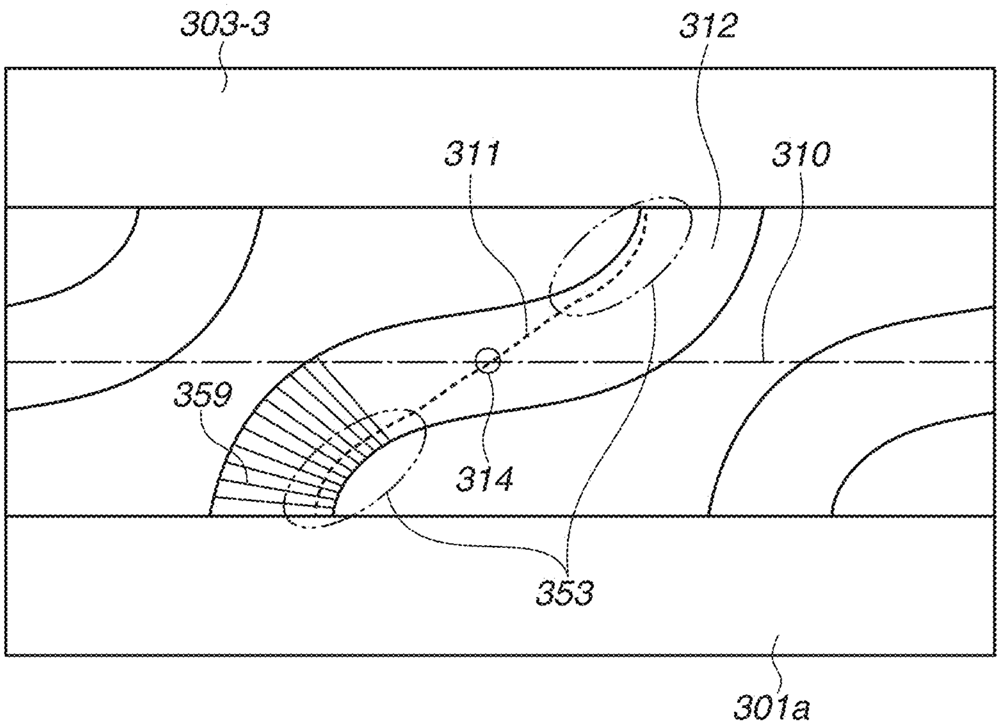
FIGS. 10A and 10B are diagrams comparing equipotential lines of the heat generation pattern of the heater according to an embodiment and equipotential lines of the heat generation pattern of the heater according to the first comparative example.
Figure 10B:
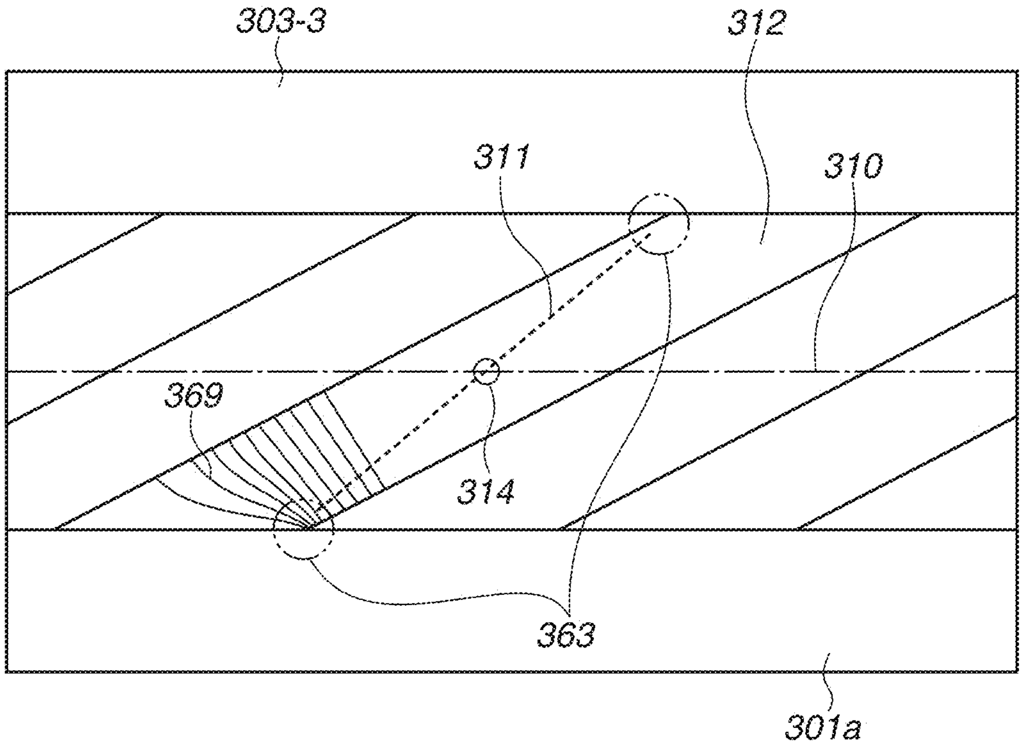

The reason why a concentration degree of the heat generation amount varies is as follows. FIGS. 10A and 10B each illustrate equipotential lines in the heat generator during energization of the heat generator. FIG. 10A illustrates equipotential lines 359 according to the present embodiment, and FIG. 10B illustrates equipotential lines 369 according to the first comparative example. The equipotential lines 369 according to the first comparative example illustrated in FIG. 10B are dense at the portion 363 where concentration of the heat generation amount is observed, and a large potential difference occurs in the narrow region. The heat generation amount is proportional to square of the potential difference. Therefore, the heat generation concentrate in such a portion where the equipotential lines are dense.

In contrast, the equipotential lines 359 according to the embodiment illustrated in FIG. 10A are less dense than the equipotential lines according to the first comparative example, and concentration of the heat generation amount is suppressed. Intervals of the equipotential lines are liable to be narrow and heat generation tends to concentrate in the region 353 where the inclination of the tangent of the shortest path of the current changes. In the present embodiment, the above-described percentage of the inclination change region is set to 20% or more (about 50% in present embodiment), which makes it possible to secure the wider region 353, and concentration of heat generation is suppressed by uniformly dispersing the equipotential lines to prevent concentration of the equipotential lines in the region 353.

In the first comparative example, deterioration of the heat generator progresses, and the heater resistance is increased in the portion where the heat generation excessively concentrates. In contrast, in the embodiment, the heat generation does not excessively concentrate in the narrow region. Thus, deterioration of the heater with duration does not occur, and durability is improved.

According to the results of the simulation of the heat generation distributions illustrated in FIGS. 9A and 9B, the heat generation amount at a portion where the heat generation amount is largest (illustrated in darkest color) in the embodiment illustrated in FIG. 9A was reduced to half of the heat generation amount at a portion where the heat generation amount is largest (center part in each of regions 363) in the first comparative example illustrated in FIG. 9B.

In the second and third comparative examples in which the shortest path of the current is bent once before the intermediate point, concentration of heat generation was observed at the point 335 in FIG. 6 and the point 345 in FIG. 7 where the current path is bent, as in the first comparative example. Deterioration of durability illustrated in Table 1 occurred for the same reason as in the first comparative example.

In the fourth comparative example in which the shortest path of the current is bent a plurality of times before the intermediate point, deterioration of the heat generators was not observed as a result of the effect of dispersing concentration of heat generation into a plurality of portions, and the effect that the length of the shortest path of the current is long and the heat generation amount per unit length is reduced. As in the fourth comparative example, increasing the distance between the conductor patterns to increase the current path makes it possible to prevent concentration of heat generation. However, the width of the heater in the transverse direction is increased, and the heater and the fixing device are upsized.

Figure 11:
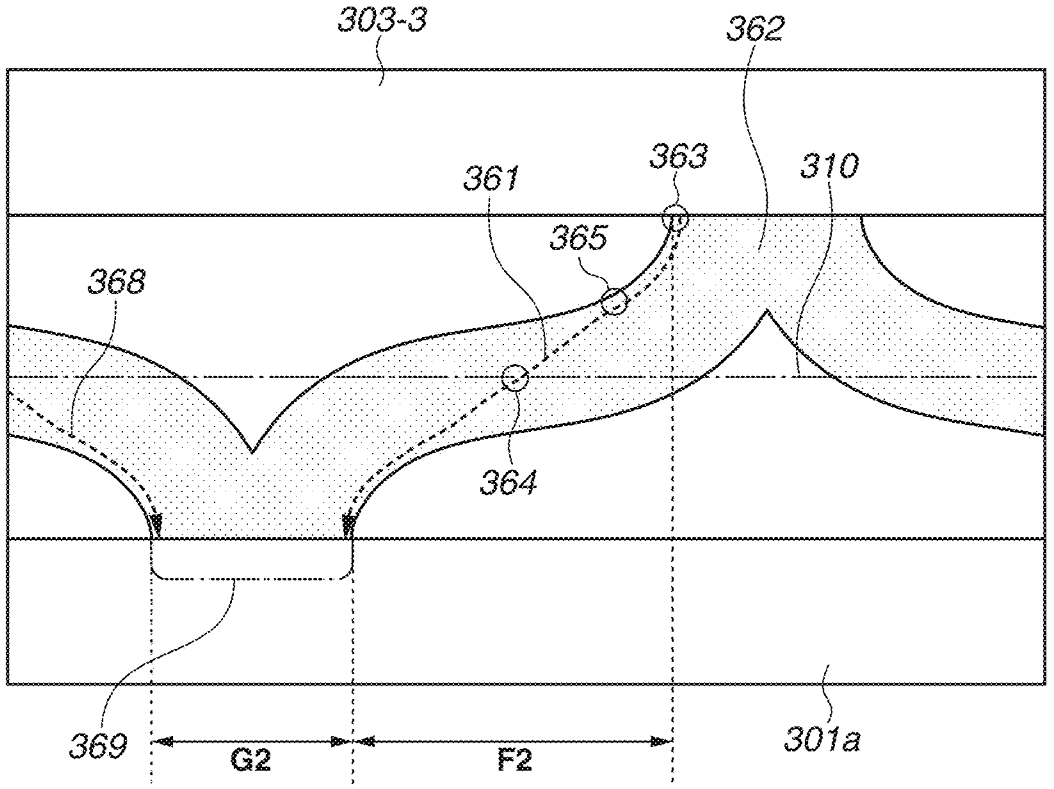
FIG. 11 illustrates a heat generation pattern of a heater according to another embodiment.

FIG. 11 illustrates a shape of a heat generator according to another embodiment. One of the heat generators has the shape illustrated in FIG. 4, a heat generator adjacent thereto is disposed upside down, and the heat generators adjacent to each other are connected on a side close to each of the conductor patterns.

As with the heat generator pattern illustrated in FIG. 4, an inclination of a tangent of a shortest path 361 of the current continuously changes between a position 363 and a position 365 before an intermediate point 364 between the conductor patterns. Therefore, as with the heat generator illustrated in FIG. 4 according to the present embodiment, the heat generation does not concentrate in the narrow region, and deterioration of the heater can be suppressed. In addition, a passing width F2 of the shortest path of the current is wider than a non-passing width G2 of the shortest path, which makes it possible to similarly suppress occurrence of temperature unevenness.

In the case of the heat generators illustrated in FIG. 4, to insulate the heat generators adjacent to each other, it is necessary to separate the heat generators by a predetermined interval or more. In contrast, in the case of the heat generators illustrated in FIG. 11, since the heat generators are connected to each other on the side close to each of the conductor patterns, it is unnecessary to separate the heat generators, and flexibility in arrangement is accordingly high. In addition, in the case of the heat generators illustrated in FIG. 11, the heat generators are often formed to partially intrude into (i.e., overlap with) each of the conductor patterns as illustrated in a portion 369, in order to stabilize electric connection of the heat generators and the conductor patterns. In the configuration illustrated in FIG. 11, the number of connection parts between the heat generators and the conductor patterns is reduced as compared with the configuration illustrated in FIG. 4. Therefore, it is possible to reduce a total area of the portions where the heat generators intrude into the conductor patterns. Even in such a case, it is possible to reduce a usage of materials of the heat generators.

Based on the above disclosure, deterioration of the heater may be suppressed while temperature unevenness may be reduced even in the case where the heater driving voltage is high. In addition, it is possible to obtain a narrower width of the heater in the transverse direction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims priority to and the benefit of Japanese Patent Application No. 2023-120517, filed Jul. 25, 2023, which is hereby incorporated by reference herein in its entirety.

What is claimed is:

1. A heater, comprising:

a heater substrate;

a first conductor disposed on a surface of the heater substrate along a longitudinal direction thereof;

a second conductor disposed substantially parallel to the first conductor, with an interval separating the second conductor from the first conductor in a transverse direction; and at least one heat generator disposed between the first conductor and the second conductor in the transverse direction and configured to electrically connect the first conductor and the second conductor, wherein the at least one heat generator is configured to generate heat in response to energization between the first conductor and the second conductor, wherein a path of a current flowing through the at least one heat generator from one of the first conductor and the second conductor to another one of the first conductor and the second conductor has a curved shape, and wherein an inclination of a tangent of the path continuously changes in a partial region before an intermediate point of the path from the one conductor to the other conductor.

2. The heater according to claim 1, wherein an inclination of a tangent of the path changes a plurality of times in a partial region before an intermediate point of the path from the one conductor to the other conductor.

3. A heater, comprising:

a heater substrate;

a first conductor disposed on a surface of the heater substrate along a longitudinal direction thereof;

a second conductor disposed substantially parallel to the first conductor, with an interval separating the second conductor from the first conductor in a transverse direction; and at least one heat generator disposed between the first conductor and the second conductor in the transverse direction and configured to electrically connect the first conductor and the second conductor, wherein the at least one heat generator is configured to generate heat in response to energization between the first conductor and the second conductor, wherein a path of a current flowing through the at least one heat generator from one of the first conductor and the second conductor to another one of the first conductor and the second conductor has a curved shape, and wherein the path extends from the one conductor to the other conductor without being folded back in the longitudinal direction.

4. The heater according to claim 1, wherein a percentage of inclination change region is 20% or more.

5. The heater according to claim 4, wherein the percentage of inclination change region is based on a distance from a point where the inclination of the tangent of the path first changes to a point where the inclination of the tangent of the path finally changes with respect to a distance from the one conductor to the intermediate point of the path of the current.

6. The heater according to claim 1, wherein at least a part of the path of the current has a curved shape.

7. The heater according to claim 1, wherein the energization is an electrical voltage applied between the first conductor and the second conductor.

8. The heater according to claim 1, wherein at least two heat generators are arranged side by side in the longitudinal direction of the heater substrate, and wherein the following relationship is satisfied:

$$F1 > G1,$$

where F1 is a distance from a start point to an end point of the path of the current flowing through one of the at least two heat generators in the longitudinal direction, and G1 is a distance from the end point of the path of the one heat generator to a start point of a path of a current flowing through the heat generator disposed next to the one heat generator in the longitudinal direction.

9. The heater according to claim 1, wherein patterns of the first conductor, the second conductor, and the heat generators are provided on a rear surface layer of the heater substrate.

10. The heater according to claim 9, further comprising a thermistor provided on a sliding surface layer on a side opposite to the rear surface layer of the heater substrate.

11. A fixing device, comprising:

a fixing film having a cylindrical shape;

the heater according to claim 1, disposed in an internal space of the fixing film; and a pressing roller configured to come into press contact with the heater via the fixing film, to form a nip portion, wherein the fixing device heats toner image formed on a conveyed recording medium at the nip portion to fix the toner image to the recording medium.

12. An image forming apparatus, comprising:

an image forming unit configured to form a toner image on a recording medium; and the fixing device according to claim 11 configured to fix the toner image formed on the recording medium by the image forming unit, to the recording medium.

13. The heater according to claim 3, wherein an inclination of a tangent of the path changes a plurality of times in a partial region before an intermediate point of the path from the one conductor to the other conductor.

14. The heater according to claim 3, wherein at least a part of the path of the current has a curved shape.

15. The heater according to claim 3, wherein the energization is an electrical voltage applied between the first conductor and the second conductor.

16. The heater according to claim 3, wherein at least two heat generators are arranged side by side in the longitudinal direction of the heater substrate, and wherein the following relationship is satisfied:

$$F1 > G1,$$

where F1 is a distance from a start point to an end point of the path of the current flowing through one of the at least two heat generators in the longitudinal direction, and G1 is a distance from the end point of the path of the one heat generator to a start point of a path of a current flowing through the heat generator disposed next to the one heat generator in the longitudinal direction.

17. The heater according to claim 3, wherein patterns of the first conductor, the second conductor, and the heat generators are provided on a rear surface layer of the heater substrate.

18. The heater according to claim 17, further comprising:

a thermistor provided on a sliding surface layer on a side opposite to the rear surface layer of the heater substrate.

19. A fixing device, comprising:

a fixing film having a cylindrical shape;

the heater according to claim 1, disposed in an internal space of the fixing film; and a pressing roller configured to come into press contact with the heater via the fixing film, to form a nip portion, wherein the fixing device heats toner image formed on a conveyed recording medium at the nip portion to fix the toner image to the recording medium.

20. An image forming apparatus, comprising:

an image forming unit configured to form a toner image on a recording medium; and the fixing device according to claim 17 configured to fix the toner image formed on the recording medium by the image forming unit, to the recording medium.

* * * * *